United States Patent [19]

Von Bergen et al.

[11] Patent Number: 5,356,320

[45] Date of Patent: Oct. 18, 1994

[54] SEAL ARRANGEMENT FOR PROPELLER SHAFTS OF SHIPS

[75] Inventors: Ernst-Peter Von Bergen, Ahlefeld; Günter Pietsch, Hamburg, both of Fed. Rep. of Germany

[73] Assignee: Blohm + Voss AG, Hamburg, Fed. Rep. of Germany

[21] Appl. No.: 88,872

[22] Filed: Jul. 8, 1993

[30] Foreign Application Priority Data

Jul. 9, 1992 [DE] Fed. Rep. of Germany ....... 4222564

[51] Int. Cl.⁵ ............................................. B63H 5/10
[52] U.S. Cl. ...................................... 440/80; 277/30; 277/97; 416/174
[58] Field of Search ............... 440/80, 81, 83; 416/174, 128, 129 R, 129 A; 277/63, 30, 97, DIG. 8

[56] References Cited

U.S. PATENT DOCUMENTS 3,413,008 11/1968 Greiner .................. 277/97 X
3,625,523 12/1971 Gardner et al. ............... 416/174

FOREIGN PATENT DOCUMENTS

1901620 8/1969 Fed. Rep. of Germany .
0279194 12/1987 Japan .................. 440/80

*Primary Examiner*—Sherman Basinger
*Attorney, Agent, or Firm*—Nils H. Ljungman & Associates

[57] ABSTRACT

A seal arrangement for controlling any large bearing clearance in the vicinity of a propeller shaft, such as for a propeller drive system for ships with two concentric propeller shafts rotating in opposite directions, has a housing ring for supporting the sealing lips and a supporting ring for supporting the housing ring and defining a clearance therebetween. This clearance can be sealed, and maintained by using elastic ring walls disposed between and interconnecting the housing to the supporting ring, so that compensation can be achieved for changes in the clearance during rotation of the propeller shaft.

7 Claims, 4 Drawing Sheets

SEAL ARRANGEMENT FOR PROPELLER SHAFTS OF SHIPS

BACKGROUND OF THE INVENTION

1. Field of the Invention

This invention generally relates to a seal arrangement for propeller drives for ships. More particularly, the seal arrangement of the present invention relates to a seal arrangement for being disposed between two concentric propeller shafts rotating in opposite directions. Such seal arrangements for propeller drives for ships with two concentric propeller shafts rotating in opposite directions from one another, generally have a seal for the outer shaft, sealing the outer shaft to the ships hull, and a seal for the inner shaft, sealing the inner shaft to the outer shaft. Such seals can be designed as lip seals, wherein the seals are connected to the stern tube of the outer shaft in a water-tight manner.

2. Background Information

On seal arrangements of the type described above, such as the arrangement as disclosed by German Laid Open Patent Application No. 1,901,620, a problem can arise as a result of the fluctuations of the clearance between the inner and outer shafts in the vicinity of the inner shaft seal. Thus, a correct seal can generally not be guaranteed, because either excessive pressure is applied to the seal lips fastened rigidly to the outer shaft, thus compressing the seal lips, or insufficient pressure is applied to the seal lips, thus adversely affecting the ability of the seal lips to seal out water.

OBJECT OF THE INVENTION

The object of the invention is to overcome the problems resulting from fluctuations between the shafts, and accordingly refine a seal arrangement of the type described above so that complete compensation for the above-mentioned clearance fluctuations can be achieved.

SUMMARY OF THE INVENTION

This object can be achieved by a seal arrangement wherein the inner shaft seal is preferably supported by a housing ring, which in turn is preferably connected to the stern tube of the outer shaft in a fluid-tight manner. The stern tube of the outer shaft can preferably have a supporting ring disposed thereabout and concentric to the housing ring. This supporting ring represents a connecting element for a fluid-tight connection to the external shaft. The housing ring can be connected to the supporting ring, and can be maintained at a radial distance from the supporting ring, by means of at least one elastic ring wall disposed therebetween. Such elastic ring walls can prevent fluid penetration.

As a result of this floating arrangement of the seal, major changes in the shaft clearance are essentially no longer transmitted directly to the seals, but are only indirectly transferred, via the elastic ring walls. Therefore, with such an arrangement, changes in shaft clearance due to fluctuations can be largely eliminated.

The present invention also provide other numerous advantageous embodiments for achieving the object of the invention.

A simple and effective solution for the watertight connection of the ring walls to each of the housing ring and the supporting ring can be provided by clamping the edges of the ring walls between adjacent ring elements, or clamping rings.

An even more extensive compensation of clearance fluctuations can be achieved by providing the housing ring with an axial extension for supporting a friction bearing. This friction bearing can work together with the inner shaft or with a bearing bush pulled onto the inner shaft. The housing ring and thus the lip seals can then be guided by the friction bearing, and may then essentially be subjected only to the comparatively small clearance generated by the friction bearing.

Additional embodiments of the present invention provide advantageous solutions for preventing axial excursions of the housing ring and thus of the lip seals. One simple solution for preventing any axial excursions of the housing ring can be achieved by means of a guide. One type of guide can preferably be configured as a ring-shaped groove, or hole, in the supporting ring, into which groove, or hole, a corresponding projection of the housing ring can project. A second type of guide can be provided by a ring-shaped groove, or hole, in the housing ring in the vicinity of the friction bearing. The inner shaft can then be provided with a bearing bush which projects into the groove of the housing ring.

The present invention also provides a simple means to effectively lubricate the friction bearing and the lip seals simultaneously with oil. By means of an arrangement according to the present invention, a lubricant caused to circulate by means of a pressure can be provided for the friction bearing. For this purpose, an oil feed to the friction bearing can be provided by means of a lubrication passage disposed inside the inner shaft, and an oil return passage can be provided in the housing ring for providing a return flow of the lubricating oil.

The seal arrangement according to the present invention is also adaptable to the increased requirements for a reliable seal at high pressures of the medium to be sealed out, as well as the requirements relating to operational safety and reliability and environmental protection. This can be done by providing a multiple lip seal with two or more lip seals located behind one another and at some distance from one another in the axial direction of the shaft. The housing ring can then preferably be made up of a block of partial housing rings, and one lip seal can preferably be braced between each two partial housing rings.

In summary, one aspect of the invention resides broadly in a seal arrangement for providing seals about a propeller shaft arrangement of a ship, the shaft arrangement including inner and outer propeller shafts disposed concentrically to one another and passing through the hull. The seal arrangement comprising a first seal arrangement for sealing between the outer propeller shaft and the hull to provide a fluid-tight seal between the outer propeller shaft and the hull, and a second seal arrangement for being disposed between the inner and outer propeller shafts to provide a fluid tight seal between the inner and outer propeller shafts. The second seal arrangement comprising a housing for being disposed about the inner shaft, at least one sealing element for being disposed about the inner shaft and being supported on the housing, the at least one sealing element having a first edge for being disposed in sealing engagement with the inner propeller shaft and a second edge for being mounted on the housing, a support device for maintaining a position of the housing about the inner shaft, the support device for being mounted to the outer propeller shaft, the support device being disposed concentric to the housing and spaced radially therefrom to define a first clearance between the support device and the housing, and at least one flexible member disposed between the housing and the support device to seal the first clearance between the housing and the support device. The at least one flexible member is configured for allowing radial movements between the inner shaft the outer shaft.

Another aspect of the invention resides broadly in a seal arrangement for providing a seal about a propeller shaft of a ship, such a ship having a hull. The arrangement comprises a housing for being disposed about the propeller shaft, at least one sealing element for being disposed about the propeller shaft and supported on the housing, the at least one sealing element having a first edge for being disposed in sealing engagement with the propeller shaft and a second end for being mounted on the housing, a support device disposed about the housing for maintaining a position of the housing about the propeller shaft, the support device being spaced radially from the housing to define a first clearance between the support device and the housing, at least one flexible member disposed between the housing and the support device to seal the first clearance between the housing and the support device, and the at least one flexible member being configured for allowing radial movement of the housing within the support means.

BRIEF DESCRIPTION OF THE DRAWINGS

The arrangement of the invention is explained below in greater detail, with reference to two embodiments illustrated in the accompanying drawings, in which.

DESCRIPTION OF THE PREFERRED EMBODIMENTS

Figure 1:
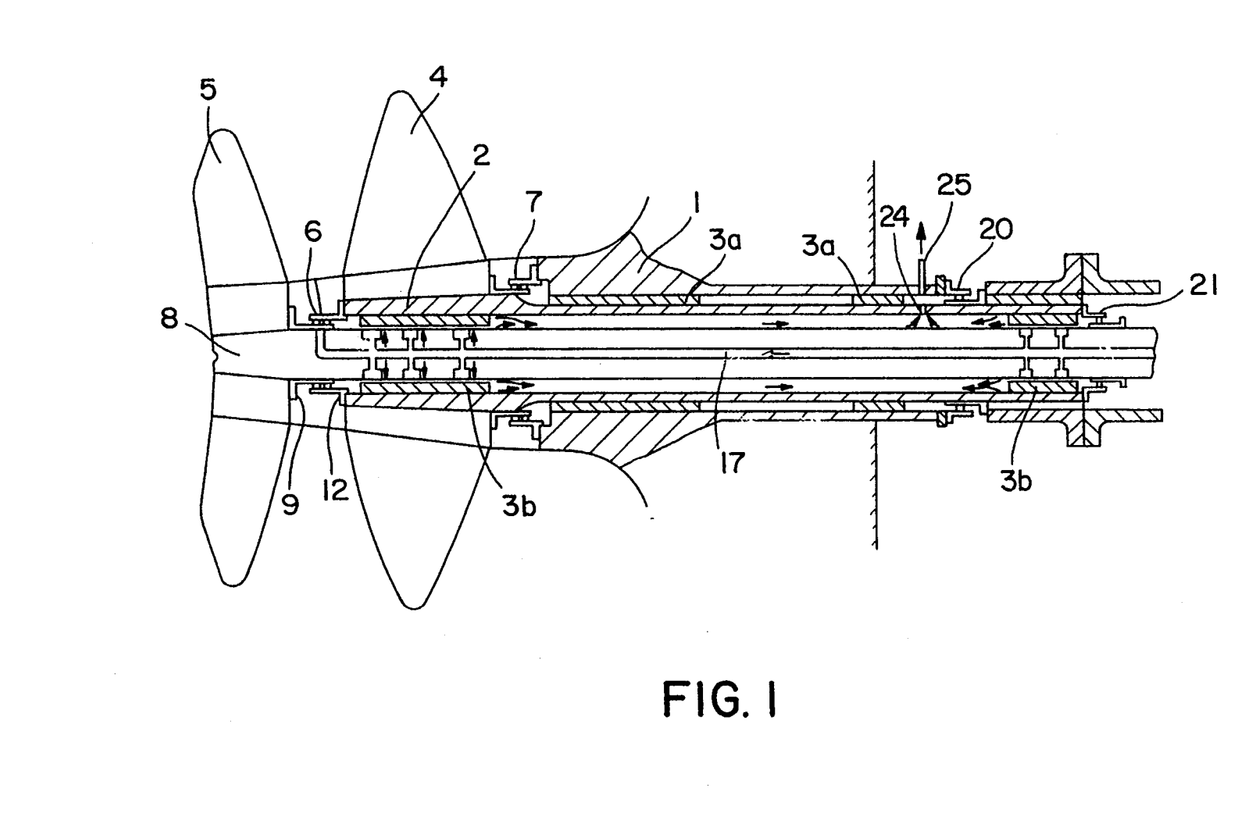
FIG. 1 shows a partial longitudinal section through the stern section of a ship with a stern tube, including an outer shaft plus an outer propeller, an inner shaft plus an inner propeller, and corresponding shaft seals and shaft bearings.
Figure 1A:
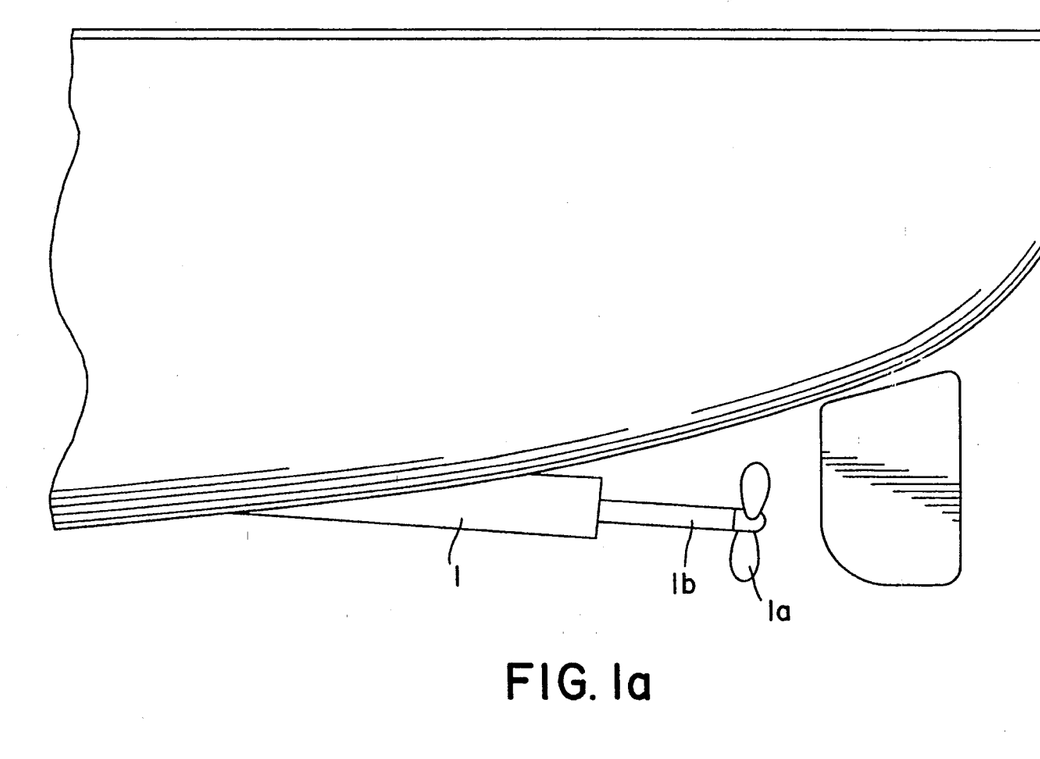
FIG. 1a generally shows a stern tube with a propeller.

FIG. 1a generally shows the bottom rear portion of a hull of a ship with a single propeller 1a. Extending rearwardly from the hull is a stern tube 1. The propeller shaft 1b passes from the interior of the ship and to the exterior thereof through the stern tube 1. The propeller 1a can be affixed to the end of the shaft 1b. An alternative embodiment of a stern tube and propeller arrangement is shown in FIG. 1, wherein there are two concentric propeller shafts 2 and 8, along with two propellers 4 and 5. In each of the figures, identical components are identified by the same reference numbers.

In the stern tube 1 for a ship having two concentric propeller shafts, which stern tube is indicated only schematically, there is generally an outer shaft 2 designed as a hollow shaft and mounted in friction bearings 3a. Within a cavity of the outer shaft 2 an inner shaft 8 can be mounted in friction bearings 3b. The outer shaft propeller is designated 4 and the inner shaft propeller is designated 5. The inner shaft seal 6 is generally located between the two propellers 4 and 5, which are at an appropriate distance from one another, while the outer shaft seal 7 is generally located between the outer shaft propeller 4 and the rear end of the stern tube 1.

Though the seal arrangement of the present invention is primarily intended for use in conjunction with the inner shaft seal 6 where problems of clearance fluctuations were previously found, such a seal arrangement could also be used for the outer shaft seal 7, or even for one of the inside seals 20 or 21 disposed within the hull. However it should be understood that seals of essentially similar configurations can be disposed in the alternate locations mentioned above. For purposes of illustration, the seal arrangement of the present invention is described in greater detail below with reference to the inner shaft seal 6, as illustrated in the accompanying FIGS. 2 and 3.

Figure 2:
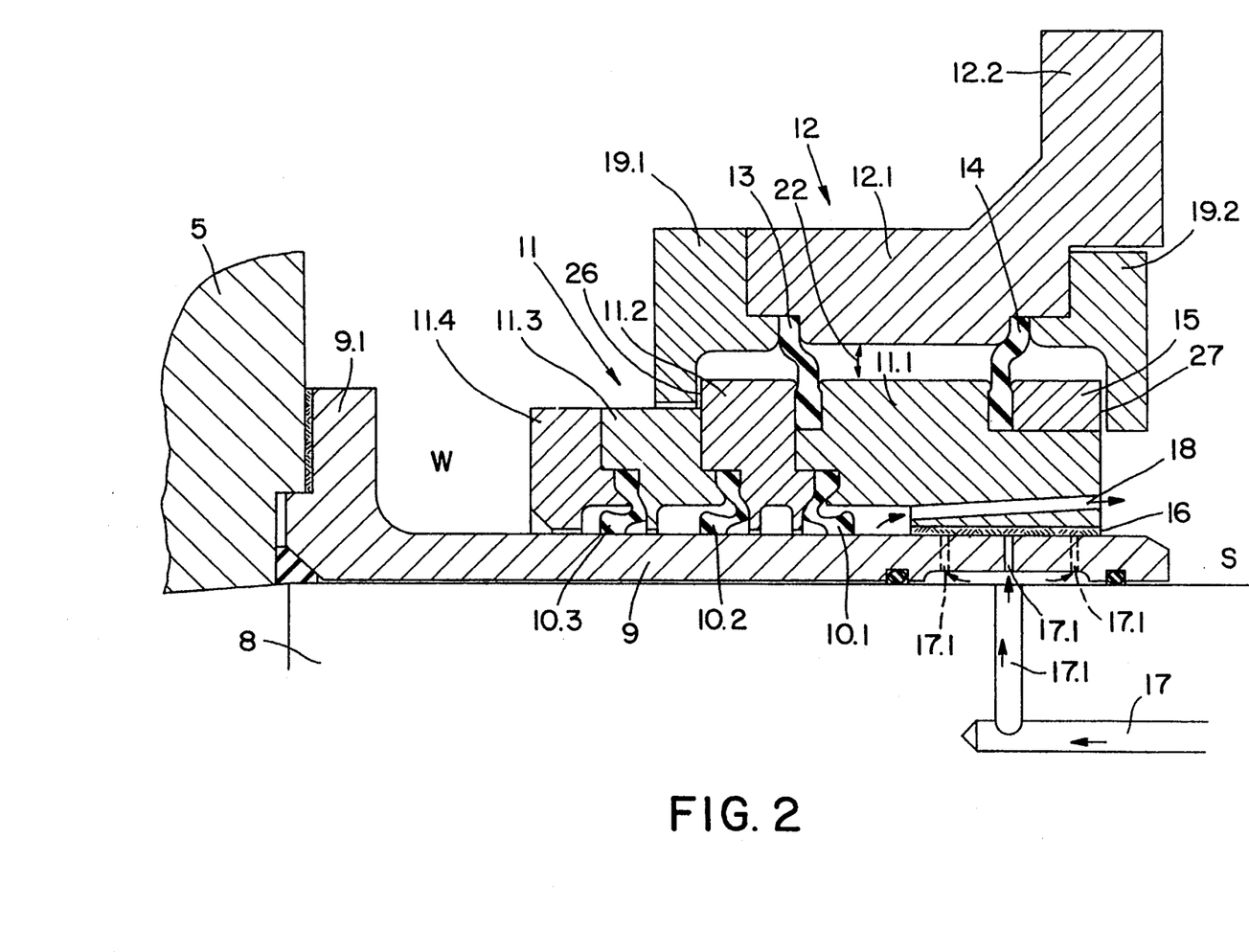
FIGS. 2 and 3 are illustrations, on an enlarged scale, of two different embodiments of the inner shaft seal as illustrated in FIG. 1.
Figure 3:
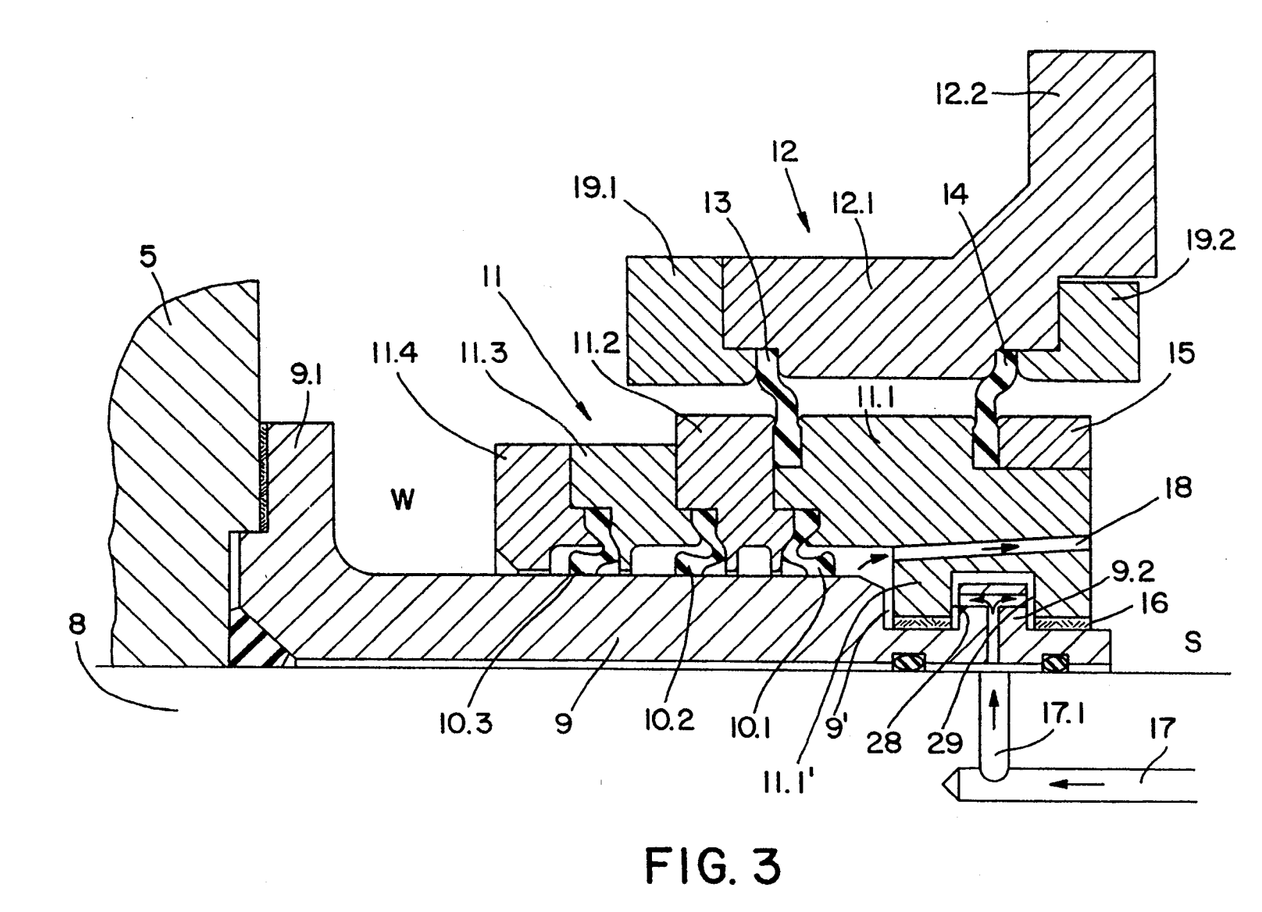

A shaft bushing 9 can preferably be disposed about the inner shaft 8. This shaft bushing 9 can then preferably be torsionally connected in a conventional manner to the inner shaft propeller 5 by means of a flange 9.1. As such, the shaft bushing 9 essentially connects the propeller 5 to the inner shaft 8 for rotation therewith.

A typical seal arrangement for sealing about a propeller shaft can generally provide that the shaft bushing 9 be contacted by at least one sealing gasket. As shown in FIGS. 2 and 3, three gaskets designed as lip seals 10.1, 10.2, 10.3, can be disposed to contact the shaft bushing. In essence, the number of seals required can vary depending on the pressures to which the seals will be subjected, etc. The three lip seals 10.1, 10.2, and 10.3 can be located at intervals, one behind another, such that two lip seals 10.2 and 10.3 essentially correspond to and face the external medium W to be sealed out, while one lip seal 10.1 corresponds to and faces the lubricating oil chamber S. Again, the actual disposition of the lip seals, in regard to their direction of sealing, can be varied depending on the circumstances in which the seals will be used.

The lip seals 10.1, 10.2, 10.3 can preferably be supported by a housing ring 11 which can include four partial housing rings 11.1, 11.2, 11.3, 11.4. The four partial housing rings can preferably be bolted together, one behind another, to form a block in the axial direction. Each lip seal can then be supported between and braced by two partial housing rings, Some examples of shaft seals for sealing about propeller shafts of ships, including typical lip seals as briefly described above, can be found in the following U.S. Patents which have common inventors with the present invention: U.S. Pat. No. 4,395,141 to Günter Pietsch et al., issued on Jul. 26, 1983 and entitled "Bearing and Seal Assembly for Stern Tubes of Vessels"; U.S. Pat. No. 4,413,829 to Günter Pietsch, issued on Nov. 11, 1983 and entitled "Shaft Sealing Assembly"; U.S. Pat. No. 4,413,830 to Günter Pietsch, issued on Nov. 8, 1983 and entitled "Seal Assembly for Rotating Shafts"; U.S. Pat. No. 4,448,425 to Ernst-Peter Von Bergen, issued on May 15, 1984 and entitled "Shaft Seal Assembly with Inflatable Annular Member"; and U.S. Pat. No. 5,137,116 to Ernst-Peter Von Bergen and Günter Pietsch, issued on Aug. 11, 1992 and entitled "Sealing Device for Rotating Shaft of a Ship Propeller Shaft".

The housing ring 11 can be supported by a supporting ring 12. Such a supporting ring could typically be rigidly mounted by means of a ring flange 12.1 onto the outer shaft 2, which outer shaft 2 is not shown in FIGS. 2 and 3. Between the housing ring 11 and the supporting ring 12, there can generally be an annular gap 22 for allowing fluctuations between the two shafts 2 and 8 during rotation. In order to minimize the fluctuations of this clearance, or annular gap 22, and provide a seal between the housing ring 11 and the supporting 12, the annular gap 22 can preferably be bridged by at least one essentially radial ring wall.

In FIGS. 2 and 3, two such radial ring walls 13, 14 are shown spaced at a distance from one another. The ring walls 13 and 14 can preferably be made from an elastic, fluid-tight material, and can be clamped in a fluid tight manner to both the housing ring 11, on one end, and the supporting ring 12, on the other end. Some of the types of elastic materials which could be used to form the ring walls 13 and 14 could possibly range from an elastomer material to an elastic, or flexible metal sheet, while it is believed that an elastomeric material should preferably be the material of choice. The ring walls can preferably be clamped between two partial housing rings 11.1, 11.2 or can be clamped by clamping rings 15, 19.1, or 19.2, to clamp the ring walls 13 and 14 to either the housing ring 11 or the supporting ring 12.

To further increase the compensation achieved by the invention in the event of excessive fluctuations of the clearance between the outer shaft 2 and the inner shaft 8, in the embodiments illustrated, there can preferably be a friction bearing 16 for the housing ring 11. Such friction bearings are generally well known for rotating shafts, and generally have a surface in contact with the rotating shaft. The bearing shell of such a friction bearing can preferably be supported by a segment 11.1 of the forward-most partial housing ring 11. As such, the segment 11.1 can preferably be extended forwardly along the shaft, and axially towards the shaft 8. The friction bearing can then be disposed on this forwardly and axially extending segment to contact the shaft bushing 9 so that the bearing shell interacts with the forward area of the shaft bushing 9.

In order to keep the friction bearings 16, 3a, 3b, etc. lubricated, the friction bearings can preferably be supplied with a lubricant, such as lubricating oil, or any other appropriate lubricant, by means of passages disposed within the inner shaft 8 and the outer shaft 2. To provide an infeed for the lubricating oil, a longitudinally oriented bore 17 can be provided within the inner shaft 8. This longitudinal passage 17 can empty via branch passages, such as passages 17.1, into the vicinity of the friction bearings. As shown, passages 17.1 empty at the inner surface of the bearing 16. In the above-mentioned extended portion of segment 11.1, there can be a return passage 18 for the lubricating oil exiting from the friction bearing 16. This return passage 18, along with the space between the inner shaft 8 and the outer shaft 2, can provide lubricating oil to the space between the outer shaft 2 and the stern tube 1 via at least one orifice 24 in the wall of the inner shaft 8 (see FIG. 1). The oil can then flow out of the outer space between the outer shaft 2 and the stern tube 1 via outlet 25 to return the lubricating oil back to a circulating pump (not shown). One type of lubricating system for a sealing arrangement of a propeller shaft is disclosed in the above mentioned U.S. Pat. No. 5,137,116.

For the above-mentioned compensation for clearance fluctuations, essentially only the displacement of the housing ring 11 in the radial direction is desired. As discussed, this is essentially made possible as a result of the elastic ring walls 13, 14. However, without additional guides, displacement in the axial direction may also occur. In order to preferably avoid such axial displacement, at least one corresponding guide, extending in the radial direction, can be provided for the housing ring 11. Such a guide, as illustrated in FIG. 2, can essentially be formed by a groove, or channel, which can be formed by the supporting ring 12 and its clamping rings 19.1, 19.2, and a corresponding projection, formed by the partial housing rings 11.1, 11.2, which projection essentially projects into the channel while maintaining a slight lateral clearance from the base of the channel. As illustrated in FIG. 2, the projection-channel guide arrangement provides a pair of adjoining axial guide surfaces illustrated at 26 and 27.

As illustrated in FIG. 3, such a guide could also be formed by a projection 9.2 of the shaft bushing 9, which projection can preferably be disposed in the vicinity of the friction bearing 16, and a corresponding groove or channel located in the extended area of the partial housing ring 11.1. In this embodiment of FIG. 3, the projection-channel guide arrangement provides a pair of adjoining axial guide surfaces illustrated at 28 and 29. With such an arrangement, the projection 9.2 can still be configured to contain branch lubricant carrying passages and thus can also act as a means for the transmission of the lubricant to the friction bearing 16. Alternatively, an additional possible guide arrangement of FIG. 3 could be considered to be formed by a projection 11.1' extending from the housing 11.1 into a recess 9' of the shaft bushing 9.

One feature of the invention resides broadly in the seal arrangement of propeller drives for ships with two concentric propeller shafts rotating in opposite directions from one another, and with a seal for the outer shaft and a seal for the inner shaft, whereby the seals, designed as lip seals, are connected to the stern tube of the outer shaft in a water-tight manner, characterized by the fact that the inner shaft seal 6 is supported by a housing ring 11, which is connected in a fluid-tight manner to a supporting ring 12 which is concentric with it but which is at a radial distance from it by means of elastic ring walls 13, 14 which prevent fluid penetration, whereby the supporting ring 12 represents the connecting element for the fluid-tight connection to the external shaft 2.

Another feature of the invention resides broadly in the seal arrangement, characterized by the fact that the fluid-tight connection of the ring walls 13, 14 to the housing ring 11 and the supporting ring 12 is made by clamping the edges of the ring walls 13, 14 between clamping rings 11.2, 11.1, 15 and 19.1, 19.2, 12.1.

Yet another feature of the invention resides broadly in the seal arrangement, characterized by the fact that the housing ring 11, in its terminal area 11.1, has an axial extension, which is designed as a support for the bearing shell of a friction bearing 16 which works together with the inner shaft 8 or with a shaft bushing 9 pulled onto the inner shaft 8.

Still another feature of the invention resides broadly in the seal arrangement, characterized by the fact that the housing ring 11 is prevented from moving in the axial direction by a guide.

Still yet another feature of the invention resides broadly in the seal arrangement, characterized by the fact that the guide consists of a ring-shaped hole in the supporting ring 19.1, 19.2, 12.1, into which a corresponding projection of the housing ring 11.2, 11.1, 15 projects.

Another feature of the invention resides broadly in the seal arrangement, characterized by the fact that the guide consists of a ring-shaped hole in the housing ring 11.1 in the vicinity of the friction bearing 16, into which a corresponding projection 9.1 of a shaft bushing 9 projects.

Still another feature of the invention resides broadly in the seal arrangement, characterized by the fact that when pressure circulating lubrication is used for the friction bearing 16, the oil feed to the friction bearing 16 takes place through a lubrication passage 17 inside the inner shaft 8, whereby there is a return passage 18 in the housing ring 11.1 for the return flow of the oil.

Yet still another feature of the invention resides broadly in the seal arrangement, characterized by the use of a multiple lip seal with two or more lip seals 10.1, 10.2, 10.3 located behind one another and at some distance from one another in the axial direction, whereby the housing ring 11 forms a block of partial housing rings 11.1, 11.2, 11.3–11.4, and whereby one of the lip seals is braced between each two partial housing rings.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A seal arrangement for providing seals about a propeller shaft arrangement of a ship, the shaft arrangement including inner and outer propeller shafts disposed concentrically to one another and passing through the hull, said seal arrangement comprising:

first seal means for sealing between the outer propeller shaft and the hull to provide a fluid-tight seal between the outer propeller shaft and the hull; and second seal means for being disposed between the inner and outer propeller shafts to provide a fluid tight seal between the inner and outer propeller shafts, said second seal means comprising:

a housing for being disposed about the inner shaft;

at least one sealing element for being disposed about the inner shaft and being supported on said housing, said at least one sealing element having a first edge for being disposed in sealing engagement with the inner propeller shaft and a second edge for being mounted on said housing;

support means for maintaining a position of said housing about the inner shaft, said support means for being mounted to the outer propeller shaft, said support means being disposed concentric to said housing and spaced radially therefrom to define a first clearance between said support means and said housing; and at least one flexible member disposed between said housing and said support means to seal said first clearance between said housing and said support means, said at least one flexible member being configured for allowing radial movements between the inner shaft and the outer shaft, and said at least one flexible member having an inner edge disposed adjacent said housing, and an outer edge disposed adjacent said support means;

said housing comprises a tubular member for being disposed about the inner propeller shaft, said housing having an exterior surface disposed adjacent said support means and an interior surface for being disposed adjacent the inner propeller shaft;

said housing comprises at least one annular recess disposed about said exterior surface thereof for receiving said inner edge of said at least one flexible member therewithin;

said at least one flexible member comprises at least one flexible ring-shaped member;

said housing comprises ring means disposed about said housing adjacent said at least one annular recess to clamp said inner edge of said at least one flexible ring-shaped member to said housing;

said support means comprises a tubular member disposed concentrically about said housing, said support means having an interior surface disposed towards said housing;

said support means comprises at least one annular recess disposed about said interior surface thereof for receipt of said outer edge of said at least one flexible ring-shaped member thereinto;

said support means comprises ring means disposed about said support means adjacent said at least one annular recess to clamp said outer edge of said at least one flexible ring-shaped member to said support means;

said housing further comprises a friction bearing for being disposed in contact with the inner propeller shaft, said friction bearing being configured for eliminating radial play between said housing and the propeller shaft;

said arrangement further comprises a bearing bush for being disposed about the inner propeller shaft within said housing;

said housing has a first end for being disposed adjacent the hull of the ship, and a second end disposed opposite to said first end;

said housing comprises, adjacent said first end, a portion extending radially inwardly towards said bearing bush;

said extending portion of said housing comprising a first surface for being disposed adjacent said bearing bush;

said first surface of said extending portion comprising said friction bearing, said friction bearing being disposed in contact with said bearing bush;

said housing is for being disposed about the propeller shaft in a fixed position along an axial direction of the inner propeller shaft, and said arrangement further comprises means for retaining said housing in said fixed axial position along the inner propeller shaft, said means for retaining comprises guide means, and said guide means comprises:

at least one of A, B and C:

A) at least one protrusion extending from said housing towards said support means, said at least one protrusion comprising an annular protrusion; and at least one corresponding recess disposed in said support means for receiving said at least one protrusion therein, said at least one corresponding recess comprising channel means disposed circumferentially within said support means;

B) at least one protrusion extending from said housing towards said bearing bush, said at least one protrusion comprising an annular protrusion; and at least one corresponding recess disposed in said bearing bush for receiving said at least one protrusion therein, said at least one corresponding recess comprising channel means disposed circumferentially about said bearing bush; and C) at least one protrusion extending from said bearing bush towards said housing, said at least one protrusion comprising an annular protrusion; and at least one corresponding recess disposed in said housing for receiving said at least one protrusion therein, said at least one corresponding recess comprising channel means disposed annularly within said housing;

the inner propeller shaft comprises a passage for providing lubricant to the vicinity of the second seal means, and the ship further comprises a lubricant supply source for supplying lubricant to the second seal means, and wherein:

said seal arrangement further comprises a plurality of passages for circulation of lubricating oil through said seal arrangement;

said bearing bush comprising at least one axial passage for being disposed in alignment with the at least one lubricant passage of the propeller shaft to provide lubricant from a lubricant supply source to lubricate the friction bearing, the lubricant for flowing axially along said bearing bush in both a forward direction of the inner shaft and a rearward direction of the inner shaft; and said radially extending portion of said housing having at least one lubricant passage therethrough for returning the lubricant portion which flows in the rearward direction back in a forward direction to return the rearward flowing lubricant back to the lubricant supply source.

2. The seal arrangement according to claim 1, wherein:

said housing has an axial direction;

said at least one flexible member comprises at least two flexible members, each of said at least two flexible members being spaced apart from one another in the axial direction of said housing;

each of said at least two flexible members comprises a flexible ring-shaped member having an inner edge disposed towards said housing and an outer edge disposed towards said support means; and each said inner edge being fixedly attached to said housing in a corresponding annular recess and each said outer edge being fixedly attached to said support means in a corresponding annular recess.

3. The seal arrangement according to claim 2, wherein:

said at least one sealing element for being disposed about the shaft comprises a plurality of lip seals disposed in a spaced apart relationship in the axial direction of said housing;

each of said plurality of lip seals having a first end for being disposed in engagement with the propeller shaft and a second end for being mounted on said housing;

said housing comprising a plurality of housing rings disposed adjacent one another in the axial direction of said housing;

each of said plurality of lip seals being clamped between adjacent ones of said housing rings;

each of said plurality of lip seals having a substantially radially extending portion comprising said second end of said lip seals and a substantially axially extending portion comprising said first end;

at least one of said plurality of lip seals having an axially extending portion for extending forwardly along the inner propeller shaft to seal in lubricating oil; and at least one of said plurality of lip seals having an axially extending portion for extending rearwardly along the inner propeller shaft to seal out water.

4. The seal arrangement according to claim 3, wherein:

each of said plurality of flexible ring-shaped members comprises one of: elastomer and elastic metal;

the outer shaft has a first end disposed away from the ship, and the inner shaft has a first end protruding out of the first end of the outer shaft;

said housing for being disposed about the inner shaft with said first edge of said lip seals in engagement with the inner shaft;

said support means for being disposed on said first end of said outer shaft;

said support means comprising flange means for fixedly attaching said support means to said outer shaft for rotation of said support means along with said outer shaft;

said annular recesses of said support means being disposed a first distance from one another;

said annular recesses of said housing being disposed a second distance from one another;

said first distance being greater than said second distance;

a first of said at least two flexible ring-shaped members being disposed towards the ship and a second of said at least two flexible ring-shaped members being disposed rearwardly of said first one;

said outer edge of said first flexible ring-shaped member for being disposed closer to the ship than said inner edge of said first flexible ring-shaped member; and said outer edge of said second flexible ring-shaped member for being disposed further from the ship than said inner edge of said second flexible ring-shaped member.

5. A seal arrangement for providing a seal about a propeller shaft of a ship, such a ship having a hull, said arrangement comprising:

a housing for being disposed about the propeller shaft;

at least one sealing element for being disposed about the propeller shaft and supported on said housing, said at least one sealing element having a first edge for being disposed in sealing engagement with the propeller shaft and a second end for being mounted on said housing;

support means disposed about said housing for maintaining a position of said housing about the propeller shaft, said support means being spaced radially from said housing to define a first clearance between said support means and said housing;

at least one flexible member disposed between said housing and said support means to seal said first clearance between said housing and said support means;

said at least one flexible member being configured for allowing radial movement of said housing within said support means;

said housing has an axial direction;

said at least one flexible member comprises at least two flexible members, each of said at least two flexible members being spaced apart from one another in the axial direction of said housing;

each of said at least two flexible members comprise a flexible ring-shaped member having an inner edge disposed towards said housing and an outer edge disposed towards said support means;

said inner edge being fixedly attached to said housing and said outer edge being fixedly attached to said support means;

said housing comprises a tubular member for being disposed about the propeller shaft, said housing having an exterior surface disposed adjacent said support means and an interior surface for being disposed adjacent the propeller shaft;

said housing comprises annular recesses disposed about said exterior surface thereof for receiving said inner edge of said flexible ring-shaped member therewithin;

said housing comprises ring means disposed about said housing adjacent said annular recesses to clamp said inner edge of said ring-shaped member to said housing;

said support means comprises a tubular member disposed concentrically about said housing, said support means having an interior surface disposed towards said housing;

said support means comprises annular recesses disposed about said interior surface thereof for receipt of said outer edge of said flexible ring-shaped member thereinto;

said support means comprises ring means disposed about said support means adjacent said annular recesses to clamp said outer edge of said flexible ring-shaped member to said support means;

said housing further comprises a friction bearing for being disposed in contact with the propeller shaft, said friction bearing being configured for eliminating radial play between said housing and the propeller shaft;

said arrangement further comprises a bearing bush for being disposed about the propeller shaft within said housing;

said housing has a first end for being disposed adjacent the hull of the ship, and a second end disposed opposite to said first end;

said housing comprises, adjacent said first end, a portion extending radially inwardly towards said bearing bush;

said extending portion of said housing comprising a first surface for being disposed adjacent said bearing bush;

said first surface of said extending portion comprising said friction bearing, said friction bearing being disposed in contact with said bearing bush;

said housing is for being disposed about the propeller shaft in a fixed position along an axial direction of the propeller shaft, and said arrangement further comprises means for retaining said housing in said fixed axial position along the propeller shaft, said means for retaining comprising guide means, and said guide means comprises:

at least one of A, B and C:

A) at least one protrusion extending from said housing towards said support means, said at least one protrusion comprising an annular protrusion; and at least one corresponding recess disposed in said support means for receiving said at least one protrusion therein, said at least one corresponding recess comprising channel means disposed circumferentially within said support means;

B) at least one protrusion extending from said housing towards said bearing bush, said at least one protrusion comprising an annular protrusion; and at least one corresponding recess disposed in said bearing bush for receiving said at least one protrusion therein, said at least one corresponding recess comprising channel means disposed circumferentially about said bearing bush; and C) at least one protrusion extending from said bearing bush towards said housing, said at least one protrusion comprising an annular protrusion; and at least one corresponding recess disposed in said housing for receiving said at least one protrusion therein, said at least one corresponding recess comprising channel means disposed annularly within said housing;

wherein the propeller shaft comprises a passage therewithin for supplying lubricant to said seal arrangement, and wherein:

said seal arrangement further comprises a plurality of passages for circulation of lubricant through said seal arrangement;

said bearing bush comprising at least one axial passage for being disposed in alignment with the at least one lubricant passage of the propeller shaft to provide lubricant to said seal arrangement and to lubricate the friction bearing, the lubricant flowing axially along said bearing bush in both a forward direction of the shaft and a rearward direction of the shaft; and said radially extending portion of said housing having at least one passage therethrough for returning the rearward flowing lubricant in a forward direction to return the rearward flowing lubricant back into confluence with the forward flowing lubricant.

6. The seal arrangement according to claim 5, wherein:

said at least one sealing element for being disposed about the shaft comprises a plurality of lip seals disposed in a spaced apart relationship in the axial direction of said housing;

each of said plurality of lip seals having a first end for being disposed in engagement with the propeller shaft and a second end for being mounted on said housing;

said housing comprising a plurality of housing rings disposed adjacent one another in the axial direction of said housing;

each of said plurality of lip seals being clamped between adjacent ones of said housing rings;

each of said plurality of lip seals having a substantially radially extending portion comprising said second end of said lip seals and a substantially axially extending portion comprising said first end;

at least one of said plurality of lip seals having an axially extending portion for extending forwardly along said propeller shaft to seal in lubricating oil; and at least one of said plurality of lip seals having an axially extending portion for extending rearwardly along said propeller shaft to seal out water.

7. The seal arrangement according to claim 6, wherein:

each of said at least two-flexible ring-shaped members comprises one of: elastomer and elastic metal;

said seal arrangement comprises a seal arrangement for being disposed between concentric propeller shafts, the concentric propeller shafts comprising an inner shaft and an outer shaft, the outer shaft having a first end disposed away from the ship, and the inner shaft having a first end protruding out of the first end of the outer shaft;

said housing for being disposed about the inner shaft with said first edge of said lip seals in engagement with the inner shaft;

said support means for being disposed on said first end of said outer shaft;

said support means comprising flange means for fixedly attaching said support means to said outer shaft for rotation of said support means along with said outer shaft;

said at least two flexible ring-shaped members comprising only two ring shaped members, with said support means having two annular recesses for receipt of the outer edge of the flexible ring-shaped members and said housing having two annular recesses for receiving the inner edge of the flexible ring-shaped members;

said two annular recesses of said support means being disposed a first distance from one another;

said two annular recesses of said housing being disposed a second distance from one another;

said first distance being greater than said second distance;

said annular recesses of said housing being disposed axially between said annular recesses of said support means;

a first of said two flexible ring-shaped members for being disposed towards the ship and a second of said two flexible ring-shaped members for being disposed rearwardly of the first;

said outer edge of said first flexible ring-shaped member for being disposed closer to the ship than said inner edge of said first flexible ring-shaped member; and said outer edge of said second flexible ring-shaped member for being disposed further from the ship than said inner edge of said second flexible ring-shaped member.

* * * * *